(12) United States Patent
Lipson et al.

(10) Patent No.: US 11,385,410 B2
(45) Date of Patent: Jul. 12, 2022

(54) MILLIMETER SCALE LONG GRATING COUPLER

(71) Applicant: The Trustees of Columbia University in the City of New York, New York, NY (US)

(72) Inventors: Michal Lipson, New York, NY (US); Aseema Mohanty, New York, NY (US); Christopher T. Phare, New York, NY (US); Moshe Zadka, Bronx, NY (US); Samantha P. Roberts, Ithica, NY (US); You-Chia Chang, New York, NY (US)

(73) Assignee: The Trustees of Columbia University in the City of New York, New York, NY (US)

( * ) Notice: Subject to any disclaimer, the term of this patent is extended or adjusted under 35 U.S.C. 154(b) by 0 days.

(21) Appl. No.: 16/626,598

(22) PCT Filed: Jun. 26, 2018

(86) PCT No.: PCT/US2018/039541
§ 371 (c)(1),
(2) Date: Dec. 26, 2019

(87) PCT Pub. No.: WO2019/005823
PCT Pub. Date: Jan. 3, 2019

(65) Prior Publication Data
US 2020/0158956 A1    May 21, 2020

Related U.S. Application Data

(60) Provisional application No. 62/524,840, filed on Jun. 26, 2017.

(51) Int. Cl.
*G02B 6/28* (2006.01)
*G02B 6/124* (2006.01)
(Continued)

(52) U.S. Cl.
CPC ........... *G02B 6/2848* (2013.01); *G02B 6/124* (2013.01); *G02B 6/136* (2013.01); *G02B 2006/12061* (2013.01)

(58) Field of Classification Search
CPC ........................... G02B 6/293; G02B 6/02057
See application file for complete search history.

(56) References Cited

U.S. PATENT DOCUMENTS

| 4,947,413 A | 8/1990 | Jewell et al. |
| 5,033,812 A * | 7/1991 | Yoshida ................... G02B 6/34 385/37 |

(Continued)

FOREIGN PATENT DOCUMENTS

WO    2019/005823 A1    1/2019

OTHER PUBLICATIONS

Coelho et al., "Enhanced refractive index sensing characteristics of optical fibre long period grating coated with titanium dioxide thin films", Sensors and Actuators B: Chemical, Oct. 31, 2014, vol. 202, 929-934.

(Continued)

*Primary Examiner* — Eric Wong
(74) *Attorney, Agent, or Firm* — BakerHostetler

(57) ABSTRACT

A millimeter scale weak grating coupler comprising a silicon waveguide having bars of overlay material of length (a) disposed periodically at a period ($\Lambda$) adjacent the silicon waveguide whereby a uniform grating output is achieved.

20 Claims, 15 Drawing Sheets

(51) Int. Cl.
*G02B 6/136* (2006.01)
*G02B 6/12* (2006.01)

(56) References Cited

U.S. PATENT DOCUMENTS

| | | | |
|---|---|---|---|
| 9,310,471 | B2 | 4/2016 | Sayyah et al. |
| 9,470,520 | B2 | 10/2016 | Schwarz et al. |
| 9,594,381 | B1 | 3/2017 | Clark et al. |
| 10,429,588 | B1* | 10/2019 | Yoo ........................ G02B 6/136 |
| D873,175 | S | 1/2020 | Li |
| 10,983,275 | B2* | 4/2021 | Popovic .............. H01L 27/1203 |
| 2004/0156589 | A1* | 8/2004 | Gunn, III ................ G02B 6/124 385/37 |
| 2005/0208768 | A1 | 9/2005 | Finlay et al. |
| 2009/0116790 | A1* | 5/2009 | Mossberg .......... B29D 11/0074 385/37 |
| 2009/0290837 | A1 | 11/2009 | Chen et al. |
| 2010/0246617 | A1 | 9/2010 | Jones |
| 2012/0230628 | A1 | 9/2012 | Hill et al. |
| 2015/0063753 | A1* | 3/2015 | Evans .................... G02B 6/132 385/37 |
| 2015/0249183 | A1* | 9/2015 | Hirasawa ............... H05B 33/14 257/98 |
| 2017/0010466 | A1* | 1/2017 | Klug .................... G02B 5/1833 |
| 2017/0045669 | A1 | 2/2017 | Nichol et al. |
| 2017/0059779 | A1* | 3/2017 | Okayama ............... G02B 6/124 |
| 2017/0068097 | A1 | 3/2017 | Honea et al. |
| 2020/0158960 | A1* | 5/2020 | Kuo .................... G02B 6/4214 |

OTHER PUBLICATIONS

Doylend et al., "Two-dimensional free-space beam steering with an optical phased array on silicon-on-insulator," Opt. Express, 2011, 19, 21595-21604.

Hulme et al., "Fully integrated hybrid silicon two dimensional beam scanner," Opt. Express, 2015, 23, 5861-5874.

Hutchison et al., "High-resolution aliasing-free optical beam steering," Optica, 2016, 3, 887-890.

Marques et al., "Highly sensitive optical fibre long period grating biosensor anchored with silica core gold shell nanoparticles", Biosensors and Bioelectronics, 2016, 75, 222-231.

Penandes JS et al, Suspended SOI waveguide with sub-wavelength grating cladding for mid-infrared, Optics Letters, vol. 39 /Issue 19, pp. 5661-5664, Jun. 2014.

Qi et al., "Highly reflective long period fibre grating sensor and its application in refractive index sensing", Sensors and Actuators B: Chemical, Mar. 2014, vol. 193, 185-189.

Raval et al., "Unidirectional waveguide grating antennas with uniform emission for optical phased arrays," Optics Letters, Jun. 2017, 1-5.

Roelkens et al., "High efficiency Silicon-on-Insulator grating coupler based on a poly-Silicon overlay," Optics Express, Nov. 2006, vol. 14, No. 24, 11622-11630.

Subramanian AZ et al, Low-Loss Singlemode PECVD Silicon Nitride Photonic Wire Waveguides for 532-900 nm Wavelength Window Fabricated Within a CMOS Pilot Line, IEEE Photonics Journal, vol. 5 / Issue 6, Dec. 2013.

Waldhausl et al., "Efficient Coupling into Polymer Waveguides by Gratings", Applied Optics, Dec. 1997, vol. 36, No. 36, 9383-9390.

Y. Chang, S. P. Roberts, B. Stern, I. Datta, and M. Lipson, "Resonance-Free Light Recycling in Waveguides," in Conference on Lasers and Electro-Optics, OSA Technical Digest (online) (Optical Society of America, 2017), paper SF1J.5.

Zadka et al., "Millimeter Long Grating Coupler with Uniform Spatial Output", CLEO, 2017, 2 pages.

* cited by examiner

MILLIMETER SCALE LONG GRATING COUPLER

CROSS-REFERENCE TO RELATED APPLICATIONS

This application is the National Stage Application of International Patent Application No. PCT/US2018/039541 filed Jun. 26, 2018, which claims priority from U.S. Provisional Patent Appl. Ser. No. 62/524,840, filed Jun. 26, 2017, the disclosures of each of which are incorporated herein by reference in their entireties for any and all purposes.

GOVERNMENT RIGHTS

This invention was made with Government support under HR0011-16-C-0107 awarded by DOD/DARPA. The Government has certain rights in the invention.

TECHNICAL FIELD

A millimeter scale long grating coupler with an arbitrary spatial output profile for optical applications is provided by using a platform based on materials such as silicon and silicon nitride ($Si_3N_4$) and varying the grating output profile to match a desired profile of the output beam.

BACKGROUND

Long gratings are critical for high resolution Optical Phased Arrays for light detection and ranging (LIDAR) systems among many other applications. However, long gratings are challenging to achieve since the light typically completely leaks out of the gratings after only a few periods due to silicon's high index of refraction compared to the $SiO_2$ waveguide cladding and grating dimensions. The grating light output is governed by the amount of light interacting with the gratings, known as grating strength. In fiber coupling, strong gratings are favorable for the output beam to match the small diameter of the fiber core. In contrast to fiber coupling, in the case of Optical Phased Arrays, for example, where small beam divergence is required, low strength and long gratings are desirable. Furthermore, the emissions of conventional gratings have an exponential output profile, forcing a trade-off between small beam divergence angle and efficiency (light loss at the end of the gratings and effectively shortening the aperture).

Previous attempts at fabricating emitters for far-field applications such as light detection and ranging (LIDAR have minimized the perturbation in the silicon waveguide by employing shallow etch depths to reduce the grating coupling strength. However, such a shallow etch is difficult to control accurately. Furthermore, despite the shallow etch, the high index contrast between the substrate and cladding layers inherently results in strong gratings. Fabricating these gratings is very challenging, which could limit their length and increase the beam divergence, ultimately affecting the device resolution. Roelkens et al. in "High efficiency Silicon-on-Insulator grating coupler based on a poly-Silicon overlay," Opt. Express 14, 11622-11630 (2006) suggested to use a polishing technique with an overlay of poly-Silicon to increase the efficiency of the gratings coupler; however, since the index of the Silicon and poly-Silicon index is comparable, the fabricated gratings strength is high.

More recently, Raval et al. disclosed in "Unidirectional waveguide grating antennas with uniform emission for optical phased arrays," Optics Letters, Posted Jun. 6, 2017, a design including two silicon nitride layers where the perturbation strength along the antenna is apodized at the sides of the waveguide to achieve uniform emission on a millimeter scale. The required perturbation strength profile is tailored to achieve a uniform output profile. The grating strength is tailored by changing the amount of indent along the waveguide. However, such a device has a complicated fabrication process. Furthermore, due to the small index contrast of this platform, the ability to steer an output beam by controlling the light's wavelength is limited.

A further improved grating coupler design is desired that provides a uniform spatial output profile over a millimeter scale long grating with robust and straightforward fabrication process. The device described herein addresses these and other needs in the art.

SUMMARY

To design a millimeter scale weak grating coupler that could function as an antenna, for example, and provides a near uniform output profile, the inventors recognized that the total light emission is related to the corrugated structure of the gratings and the ability of the gratings to emit light (its strength) and amount of light in the waveguide. In particular, if the gratings strength is constant along the waveguide, it means the total emission will have a nonlinear (exponential) profile since some of the light is emitted along the gratings and the intensity of light in the waveguide is reduced as the grating gets further from the light source. Thus, to obtain a uniform output profile, the gratings are engineered so that they are less strong in the beginning of the grating structure closer to the light source and the strength increases as the distance from the light source is increased. That way the overall emission due to the grating strength and light intensity in a waveguide can be made uniform along an entire millimeter structure.

In an example, a millimeter scale weak grating coupler comprising a silicon waveguide having bars of overlay material of length (a) disposed periodically at a period ($\Lambda$) adjacent the silicon waveguide. As a further example, an arbitrary light output may be achieved from the grating. As yet a further example, a substantially uniform light output may be achieved from the grating. As used herein, adjacent means on or in proximity to and does not foreclose intervening layers including air or fluid.

In exemplary embodiments, this engineered structure is achieved by changing the length of the $Si_3N_4$ bars above the Silicon waveguide. A uniform grating output is achieved by varying the duty cycle of the $Si_3N_4$ bars (length a) as a portion of the period length ($\Lambda$) of each constant grating period along the entire length of the gratings. Using the $Si_3N_4$ as a low index material overlay, the index contrast between the grating layer and the surrounding cladding are simultaneously reduced while the grating perturbation is also moved further away from the mode that travels in the silicon waveguide thus achieving low grating strength.

In further exemplary embodiments, the grating coupler is formed by creating bars of $Si_3N_4$ of length a disposed periodically at a period length $\Lambda$ above a silicon waveguide whereby a duty cycle of a/$\Lambda$ is varied along a top of the silicon waveguide so as to provide a uniform grating output. Typically, the duty cycle decreases along the silicon waveguide as the grating strength decreases. The techniques may be used to form gratings of arbitrary lengths.

In other exemplary embodiments, the grating coupler is formed by depositing on a Silicon On Insulator (SOI) wafer a thin (e.g., 3-5 nm) stop layer of $Al_2O_3$, depositing an $Si_3N_4$ grating layer on the stop layer, patterning desired gratings, and etching the grating layer to the stop layer in accordance with a flat-top function whereby bars of $Si_3N_4$ of length a are disposed periodically at a period $\Lambda$ above the wafer whereby a duty cycle of a/$\Lambda$ decreases along the wafer moving away from a light source whereby a uniform grating output is achieved. A waveguide is patterned and etched from the wafer whereby the duty cycle of a/$\Lambda$ decreases along the waveguide moving away from the light source. Sift may also be deposited on the grating coupler to provide cladding. In the exemplary embodiments, duty cycles of the gratings are analytically mapped to a flat-top required strength set forth by the flat-top function so as to produce a profile of duty cycles per period for an entire length of the gratings.

BRIEF DESCRIPTION OF THE DRAWINGS

The above and other objects and advantages of the invention will be apparent to those skilled in the art based on the following detailed description in conjunction with the appended figures, of which.

DETAILED DESCRIPTION OF ILLUSTRATIVE EMBODIMENTS

Figure 1:
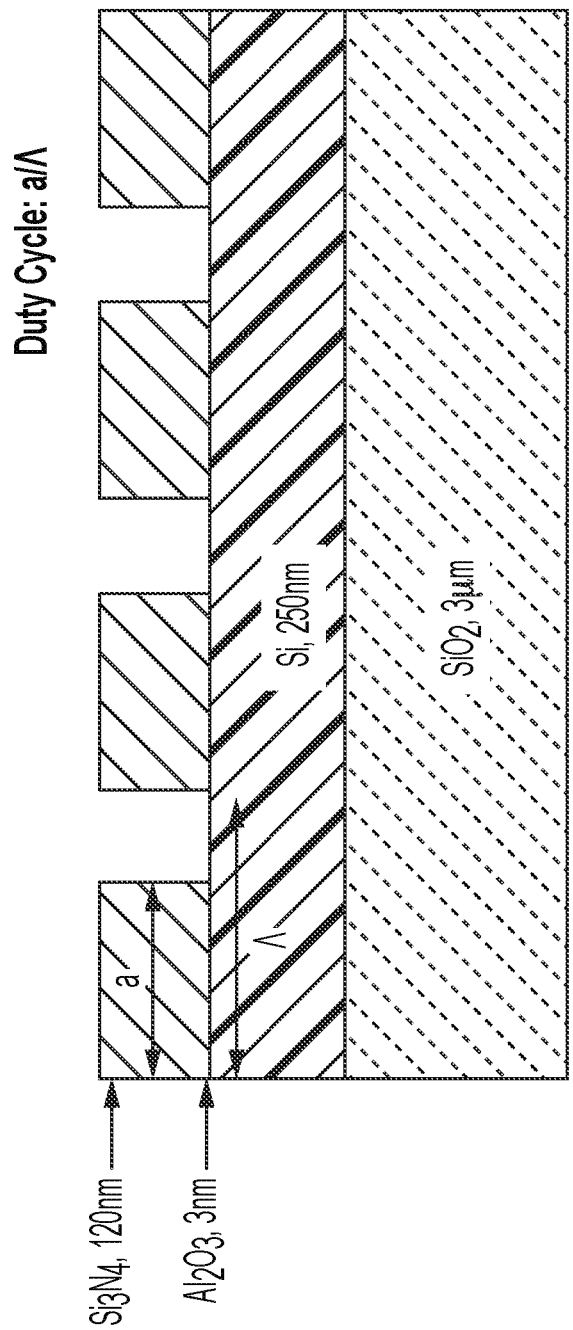
FIG. 1 shows a cross section of a device in accordance with an exemplary embodiment.

An exemplary embodiment of a method and device for obtaining a grating coupler with a uniform output profile is described below with respect to FIGS. 1-5. Those skilled in the art will appreciate that the steps and devices described are for exemplary purposes only and are not limited to the specific processes or devices described.

Overview

A long grating with uniform output profile is provided by using a platform based on Silicon and $Si_3N_4$ and uniform grating output is achieved by varying the duty cycle along the length of the gratings. Using the $Si_3N_4$ as a low index material overlay, the index contrast between the grating layer and the surrounding cladding are simultaneously reduced while also moving the grating perturbation further away from the mode that travels in the Silicon waveguide thus achieving low grating strength. The overlay also increases the fabrication robustness since it is straightforward to deposit such a layer uniformly and the grating strength is less sensitive to the layer thickness compared to conventional etching into the Silicon. The uniform grating output is engineered by first creating a normalized flat-top output. Then, the grating strength required for a flat-top function is found using the relationship:

$$2\alpha(z) = \frac{F^2(z)}{1 - \int_{z_0}^{z} F^2(z)dz} \quad \text{Equation (1)}$$

where α is the grating strength and F is the flat-top function, or any function for the desired emission. Finally, for each period, the grating strength is converted to duty cycle as reflected in FIG. 5. This process results in roughly varying the duty cycle from high at the beginning of the grating to low at the end, which in turn varies the output from weak to strong, flattening the output as the optical power in the waveguide decays along its length.

Aspects

The present disclosure includes at least the following aspects:

Aspect 1: A millimeter scale weak grating coupler comprising a silicon waveguide having a plurality of bars of overlay material of length (a) disposed periodically at a period ($\Lambda$) adjacent the silicon waveguide.

Aspect 2: The grating coupler of aspect 1, wherein a duty cycle of (a/$\Lambda$) is uniform along the top of the waveguide.

Aspect 3: The grating coupler of aspect 1, wherein a duty cycle of (a/$\Lambda$) is varied along the top of the waveguide.

Aspect 4: The grating coupler of aspect 3, wherein the duty cycle increases along the silicon waveguide as a grating strength decreases.

Aspect 5: The grating coupler of any one of aspects 1-4, further comprising a stop layer disposed between the overlay material and the waveguide.

Aspect 6: The grating coupler of any one of aspects 1-5, wherein a dimension of one or more bars of overlay material along at least one axis is varied across the plurality of bars.

Aspect 7: The grating coupler of any one of aspects 1-6, wherein the overlay material has an index of refraction that is between an index of refraction of the waveguide and an index of refraction of a cladding material disposed adjacent the waveguide.

Aspect 8: The grating coupler of any one of aspects 1-7, wherein the overlay material comprises $Si_3N_4$.

Aspect 9: A method of forming a grating coupler comprising: depositing on a Silicon On Insulator (SOI) wafer a stop layer; depositing a grating layer on the stop layer; patterning desired gratings; and etching, based on the patterning, the grating layer to create the desired gratings, whereby bars of the remaining grating layer of width "w" and length "a" are disposed periodically at a period "$\wedge$" on the wafer.

Aspect 10: The method of aspect 9, wherein a duty cycle of (a/$\wedge$) is uniform along the top of the wafer.

Aspect 11: The method of aspect 9, wherein a duty cycle of (a/$\wedge$) is varied along the top of the wafer.

Aspect 12: The method of any one of aspects 9-11, further comprising patterning and etching a waveguide from the wafer whereby the duty cycle of a/$\wedge$ increases along the waveguide moving away from a light source.

Aspect 13: The method of any one of aspects 9-12, wherein the stop layer comprises $Al_2O_3$ or $SiO_2$, or both.

Aspect 14: The method of any one of aspects 9-13, wherein the grating layer comprises $Si_3N_4$.

Aspect 15: The method of any one of aspects 9-14, wherein a material forming the stop layer is selected such that it will not etch during the etching step, effectively stopping the etch from penetrating the waveguide layer.

Aspect 16: The method of any one of aspects 9-14, wherein etch chemistry and process parameters of the etching step are selected such that an etch rate of the stop layer is lower than an etch rate of the grating layer.

Aspect 17: The method of any one of aspects 9-16, further comprising depositing a cladding material on the grating coupler.

Aspect 18: The method of aspect 17, wherein the grating layer has an index of refraction that is between an index of refraction of the wafer and an index of refraction of the cladding material.

Aspect 19: The method of any one of aspects 9-18, further comprising analytically mapping duty cycles of the gratings to a required strength set forth by a predetermined function so as to produce a profile of duty cycles per period for an entire length of the gratings.

Aspect 20: The method of aspect 19, wherein the predetermined function is dependent on an emission intensity profile or phase profile as a function of the direction of propagation.

Device Structure

Figure 2:
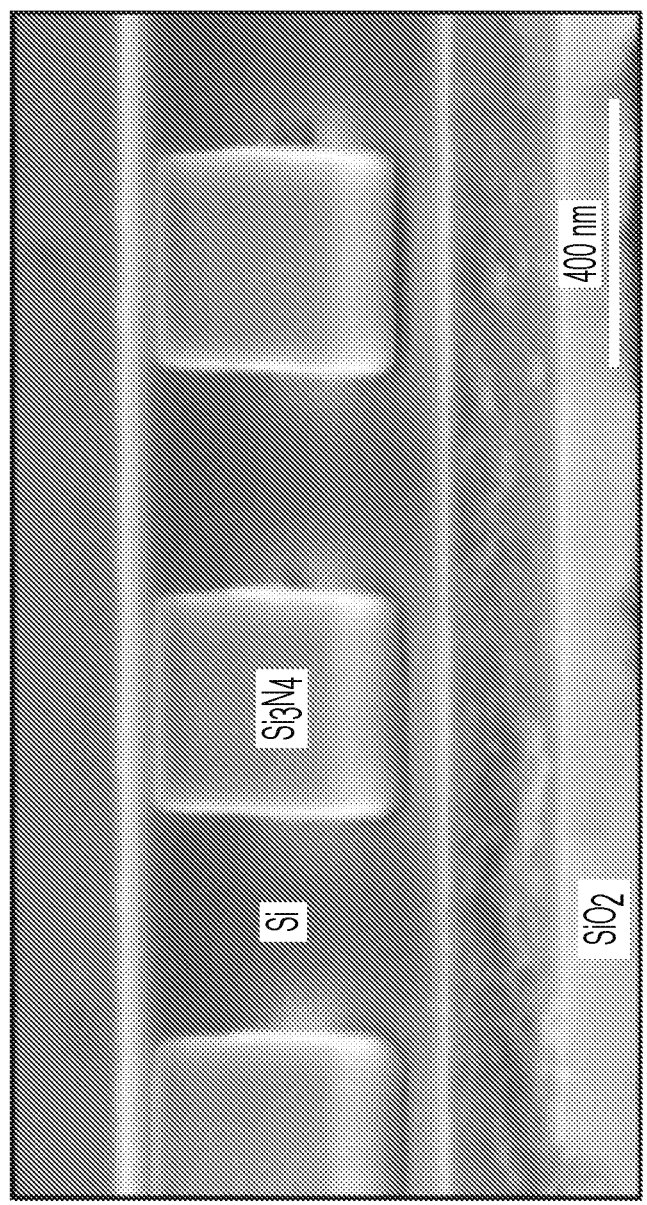
FIG. 2 shows a tilted Scanning Electron Microscopy picture of the gratings overlaying the silicon waveguide.
Figure 3:
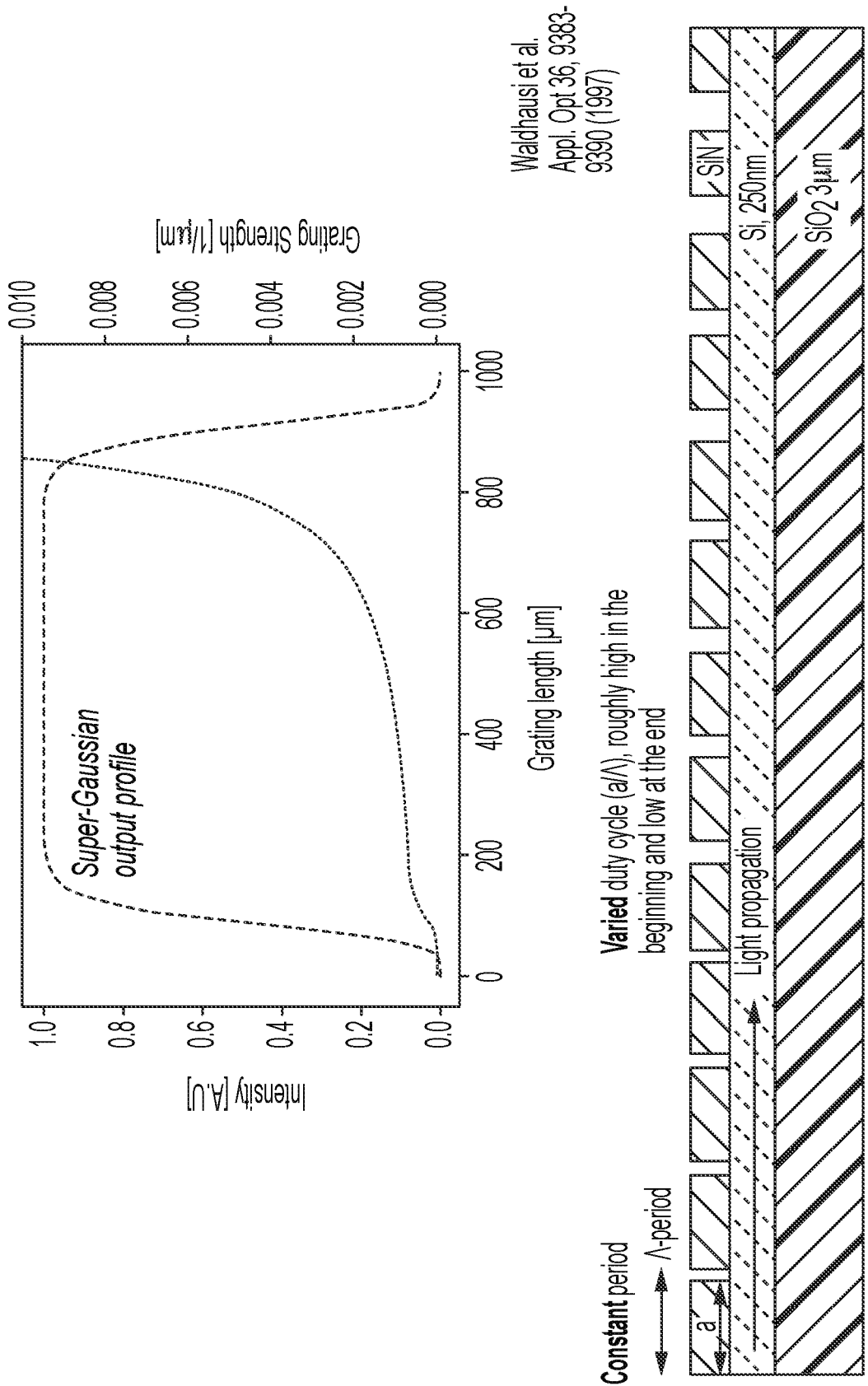
FIG. 3 illustrates a grating having a constant period ($\Lambda$) but a varied duty cycle (a/$\Lambda$) that has a relatively high value at the beginning of the grating near the light source and a relatively low value at the end of the grating away from the light source.

As described herein, a low strength grating which is robust to fabrication variation can be achieved using a platform based on both silicon and $Si_3N_4$. FIG. 1 shows a cross section of a device in accordance with an exemplary embodiment. As shown the $Al_2O_3$ stop layer and $Si_3N_4$ grating layer are provided on top of the Silicon on Insulator (SOI) wafer. FIG. 2 shows a tilted Scanning Electron Microscopy picture of the gratings overlaying the silicon waveguide. In exemplary embodiments, a uniform grating output can be achieved by varying the duty cycle a/$\wedge$ along the length of the gratings. Using the $Si_3N_4$ as a low index material overlay, the index contrast between the grating layer and the surrounding cladding are simultaneously reduced while the grating perturbation is also moved further away from the mode that travels in the Silicon waveguide thus achieving low grating strength. The overlay also increases the fabrication robustness since it is straightforward to deposit such a layer uniformly and the grating strength is less sensitive to the layer thickness compared to conventional etching into the Silicon. A thin stop layer protects the silicon during the $Si_3N_4$ etch, since etching the silicon will increase the grating strength. A uniform grating output is engineered by first creating a normalized flat-top output. Then, similar to the process described by Waldhausl et al. in "Efficient Coupling into Polymer Waveguides by Gratings," Appl. Opt. 36, 9383 (1997), the strength per period corresponding to the flat-top function is found. Finally, for each period, the grating strength is converted to duty cycle. As illustrated in FIG. 2, this process results in roughly varying the duty cycle from high at the beginning of the grating to low at the end, which in turn varies the output from weak to strong, flattening the output profile as the optical power in the waveguide decays along its length.

Device Fabrication

A multilayer deposition process is used to form the silicon nitride gratings and underlying waveguides. Starting with a Silicon On Insulator (SOI) wafer with a 250 nm silicon device layer and a 3 µm buried oxide layer, a very thin (3-5 nm) stop layer of $Al_2O_3$ is deposited followed by another deposition of 120 nm $Si_3N_4$ grating layer. A thin stop layer protects the silicon during the $Si_3N_4$ etch, since etching the silicon will increase the grating strength. After using electron-beam lithography (Elionix) to pattern the gratings, the $Si_3N_4$ film is etched to the $Al_2O_3$ stop layer (see FIGS. 1-2). The waveguides are then patterned and etched and the process finishes with cladding the wafer by depositing $SiO_2$ on the devices. Light is coupled to the waveguides using edge couplers and lensed fibers at 1550 nm. The grating output is imaged using an IR camera, which is used to measure the light output from the grating.

The inventors have experimentally demonstrated low grating strength of 3.5 [1/mm] at 50% duty cycle with good agreement to simulations, which is a much lower grating strength than the 150 [1/mm] grating strength of a simulated typical silicon shallow etch gratings (220 nm Si, 2 µm box, 25 nm etch, period 0.6 µm). The grating strength for several fabricated duty cycles is plotted in FIG. 4(a) for devices with a 120 nm $Si_3N_4$ overlay grating layer. As illustrated, the 50% duty cycle is the strongest and the gratings strength decreases thereafter, as expected. The higher strength of the experimental gratings compared to the simulation results could be due to the thin stop layer. The $Al_2O_3$ stop layer was only 3 nm thick, and the $Si_3N_4$ etch penetrated it slightly and created a shallow grating of 2-3 nm deep in the silicon waveguide layer. This increased the overall grating strength.

Figure 4A:
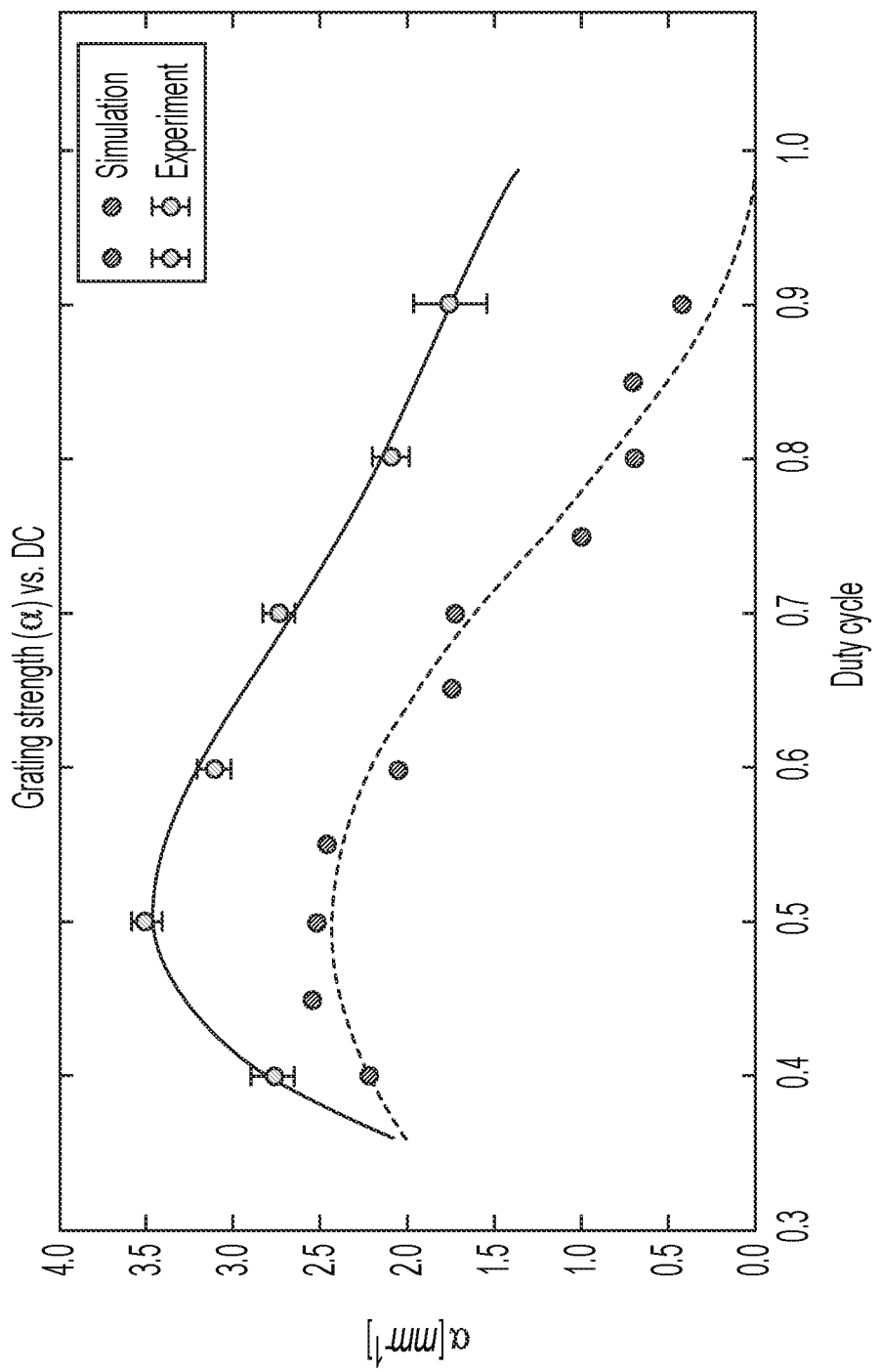
FIG. 4(a) illustrates the grating strength for several fabricated duty cycles for devices with a 120 nm $Si_3N_4$ overlay grating layer.
Figure 4B:
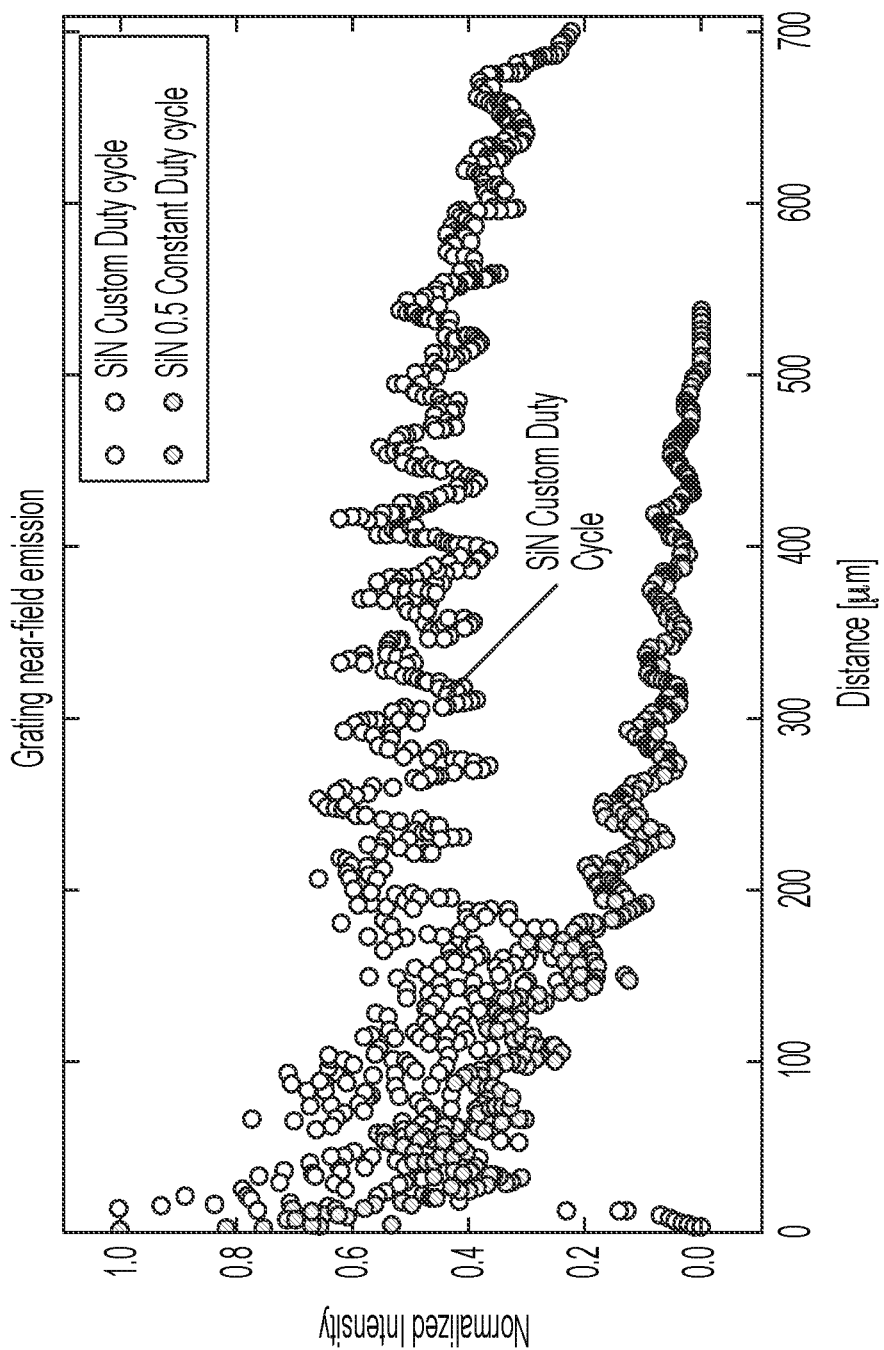
FIG. 4(b) illustrates a comparison of the spatial distribution of light from a $Si_3N_4$ grating overlay with constant duty cycle (50%) and from the designed $Si_3N_4$ grating with custom duty cycle.
Figure 5:
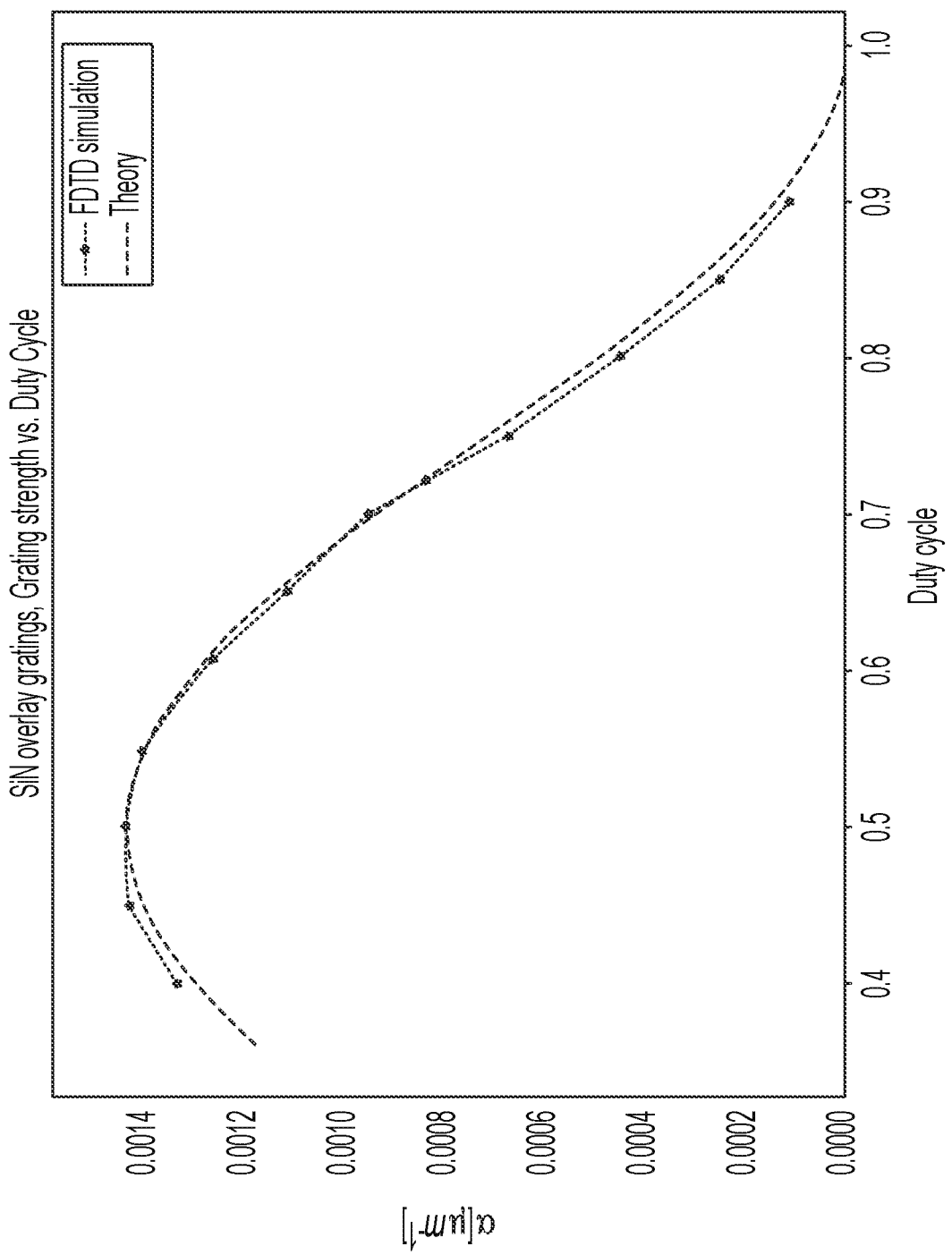
FIG. 5 illustrates the grating strength converted to duty cycle.

By varying the duty cycles a/$\wedge$ along the gratings length to match a flat-top function, it is possible to achieve a much more uniform near-field output than that of a constant duty cycle over a grating having a length of one millimeter or less. The grating strength is calculated for several gratings with different duty cycles by fitting their near-field output to an exponent. Then, the grating strength required for a flat-top function is found using Equation (1) above, where α is the grating strength and F is the flat-top function. In the last step, duty cycles of the gratings are analytically mapped to the flat-top required strength, producing a profile of duty cycles per period for the entire gratings length. FIG. 4(b) shows a comparison of the spatial distribution of light from a $Si_3N_4$ grating overlay with constant duty cycle (50%) and from the designed Si₃N₄ grating with custom duty cycle. As illustrated, the designed grating (Si₃N₄ custom duty cycle) has an almost uniform intensity as a function of length along the grating compared to the diminished intensity as a function of length along the grating shown for the constant duty cycle grating (SiN 0.5 constant duty cycle).

The techniques disclosed herein demonstrate control over the strength of the grating and the near-field output profile of the beam. A Si₃N₄ overlay is used on the SOI substrate to fabricate a near-uniform grating output over 1 mm or less with low grating strength measured over various duty cycles. By engineering the duty cycle of the gratings, it is shown that using different grating strengths along the grating length increases the gratings near-field output uniformity. Those skilled in the art will appreciate that the techniques described herein provide a path for integrating gratings in Optical Phased Arrays with very narrow beam divergence and high resolution.

Long Grating and Custom Output Profile

Figure 6A:
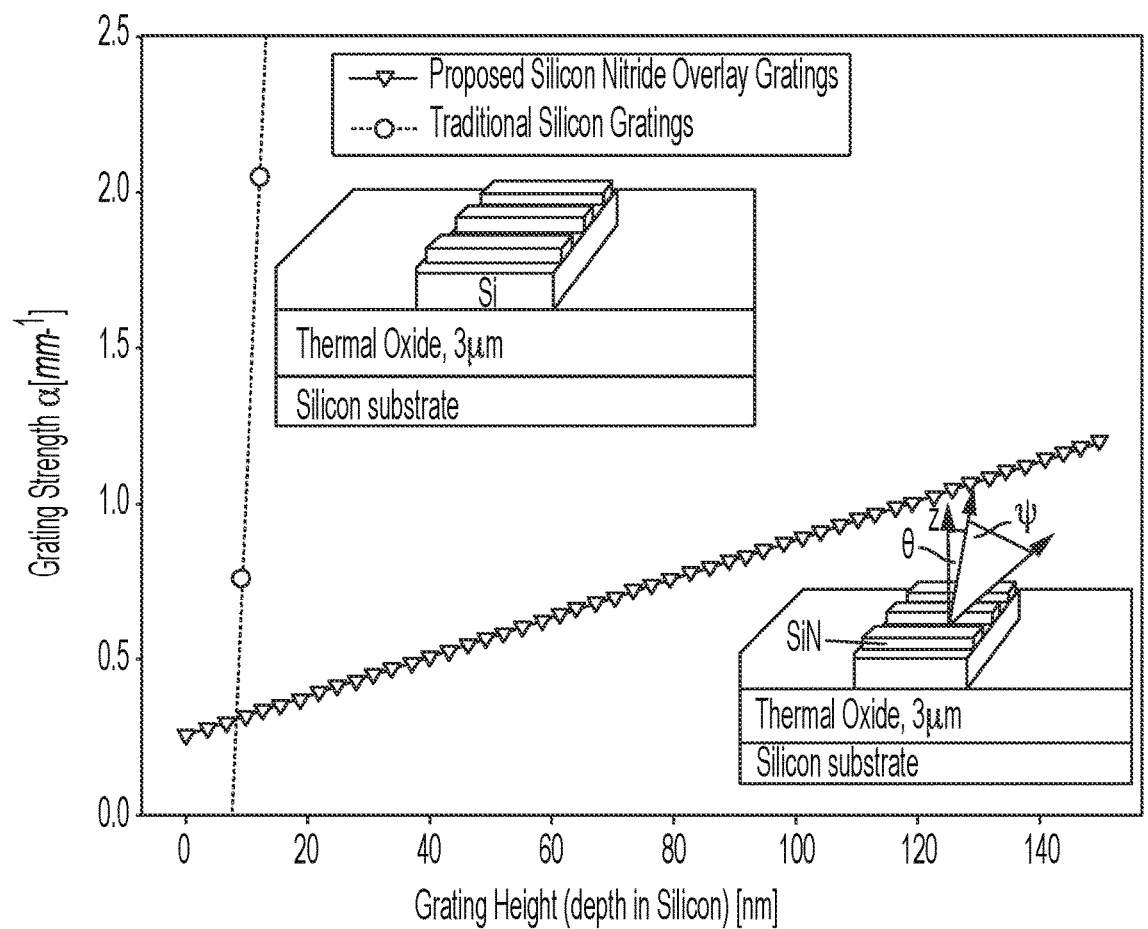
FIG. 6 illustrates simulation of grating's sensitivity to process variations. (a) Strength of grating formed by etching a 250 nm×450 nm silicon waveguide (orange) and by etching a 120 nm silicon nitride overlay on the same silicon waveguide (blue). The period of both gratings is 650 nm. Cross section and spatial mode distribution for a silicon waveguide (b) and for the same waveguide with a silicon nitride overlay (c). One can see that the silicon waveguide tightly confines the light, thus the silicon-nitride overlay only slight perturb the mode.
Figure 6B:
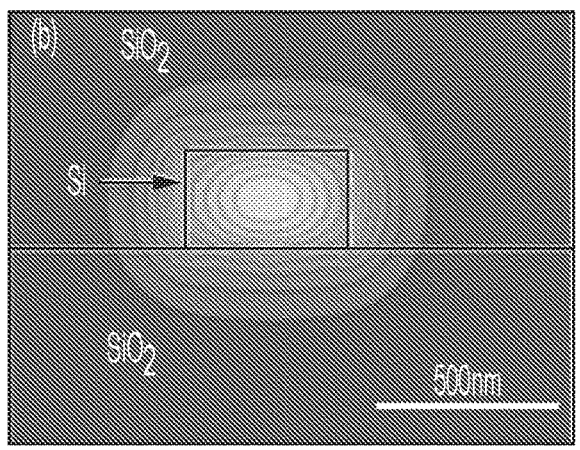
Figure 6C:
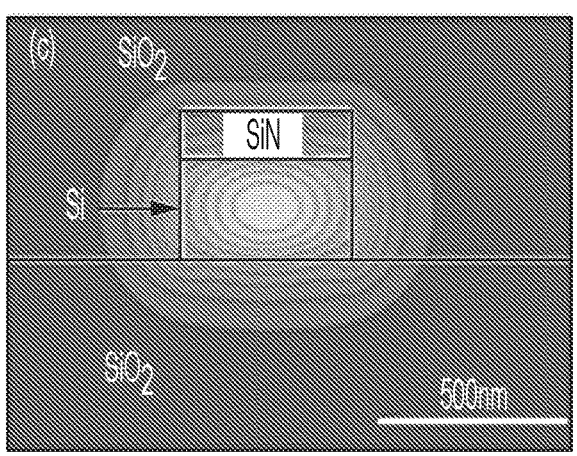

FIG. 6 illustrates a contrast in existing grating design in Silicon only to one with Silicon as waveguide and Silicon-Nitride overlay for the grating. Using Silicon for both guiding the light and gratings lead to gratings with large scattering coefficient (strong gratings), which limits their length. (b) and (c) compare the light distribution for both illustrating that most light does not interact with the Silicon Nitride overlay, leading to weak (and long) gratings.

Figure 7A:
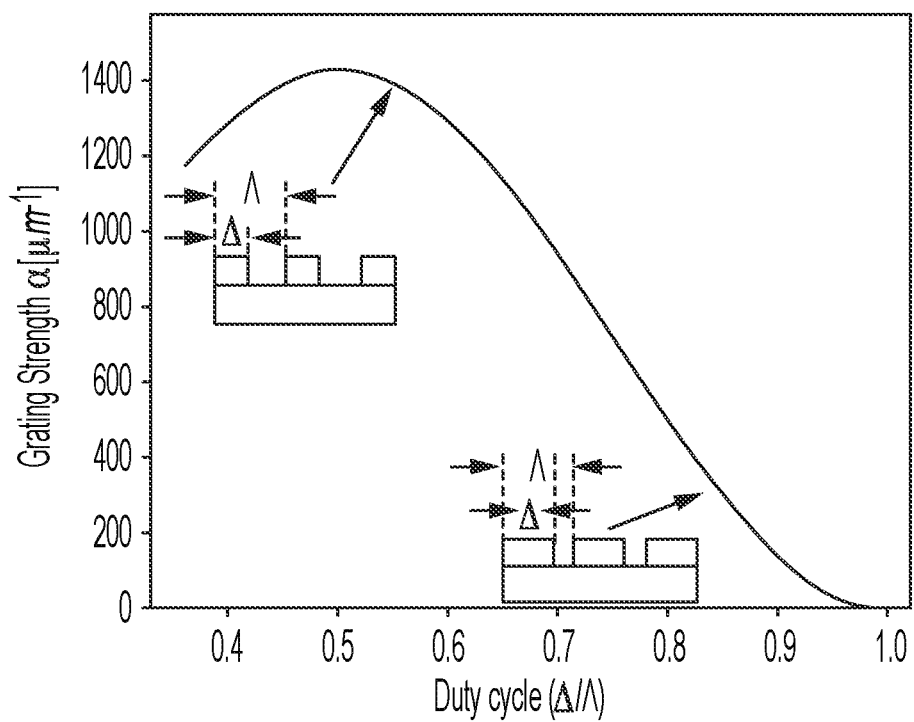
FIG. 7 illustrates grating uniform emission design by apodizing the grating's duty cycle. (a) Grating's strength dependence on duty cycle extracted from 3D FDTD simulations. (b) The desired super-Gaussian emission profile (blue) and its corresponding grating's strength (orange).
Figure 7B:
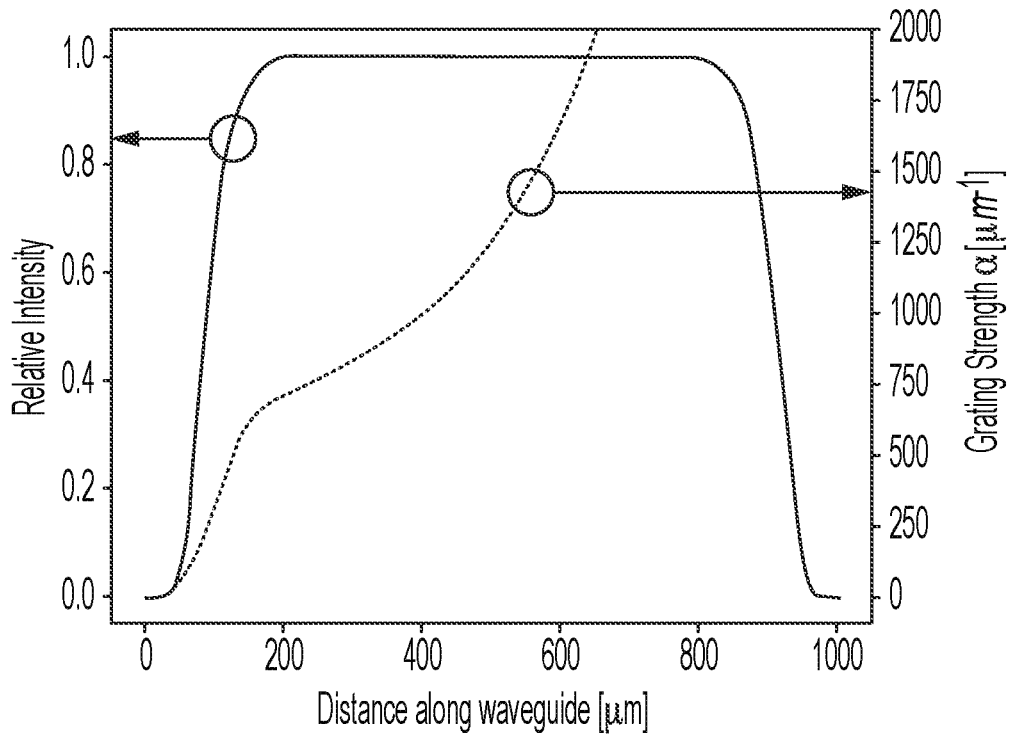
Figure 8A:
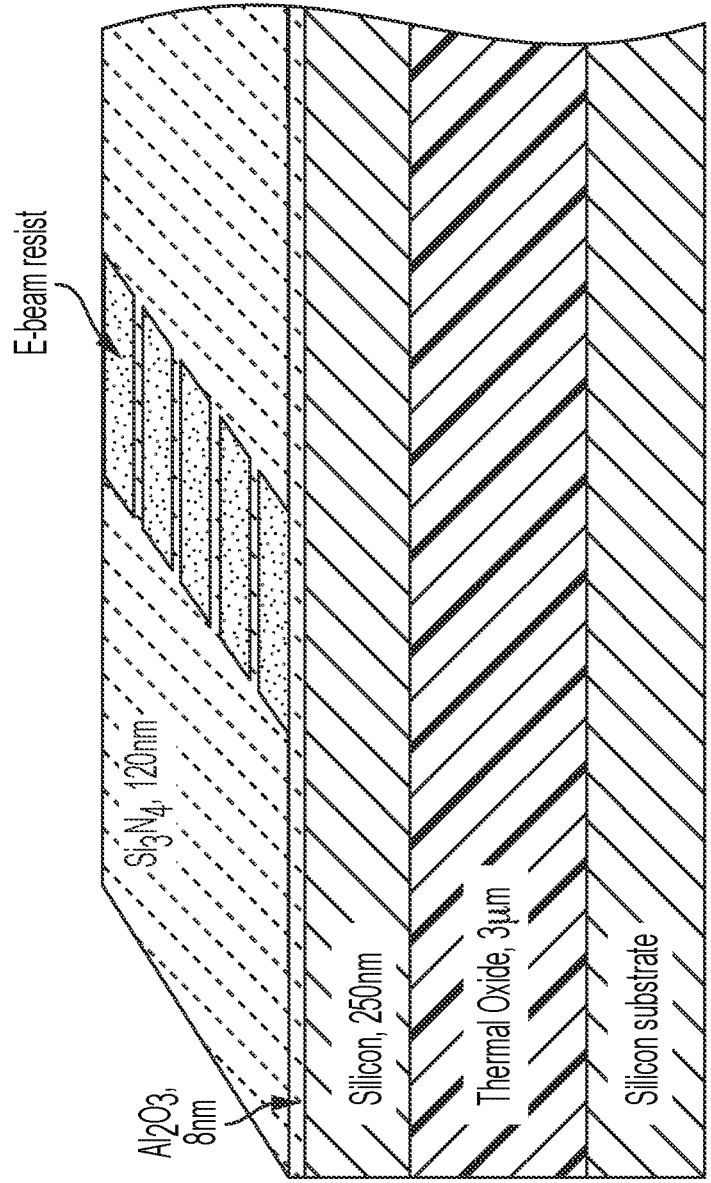
FIG. 8 illustrates platform fabrication steps. (a) Deposition of 8 nm of $Al_2O_3$ and 120 nm of silicon nitride layers. Defining the grating using E-beam. (b) Etching of silicon-nitride layer and stopping on the $Al_2O_3$ layer. (c) Defining the waveguides using E-beam (450 nm wide), etching, and stopping on the thermal oxide layer. Later, device is cladded with 1 μm of PECVD $SiO_2$. (d) Falsed-colored tilted Scanning Electron Microscopy picture of the silicon-nitride grating overlay after the waveguide etch.
Figure 8B:
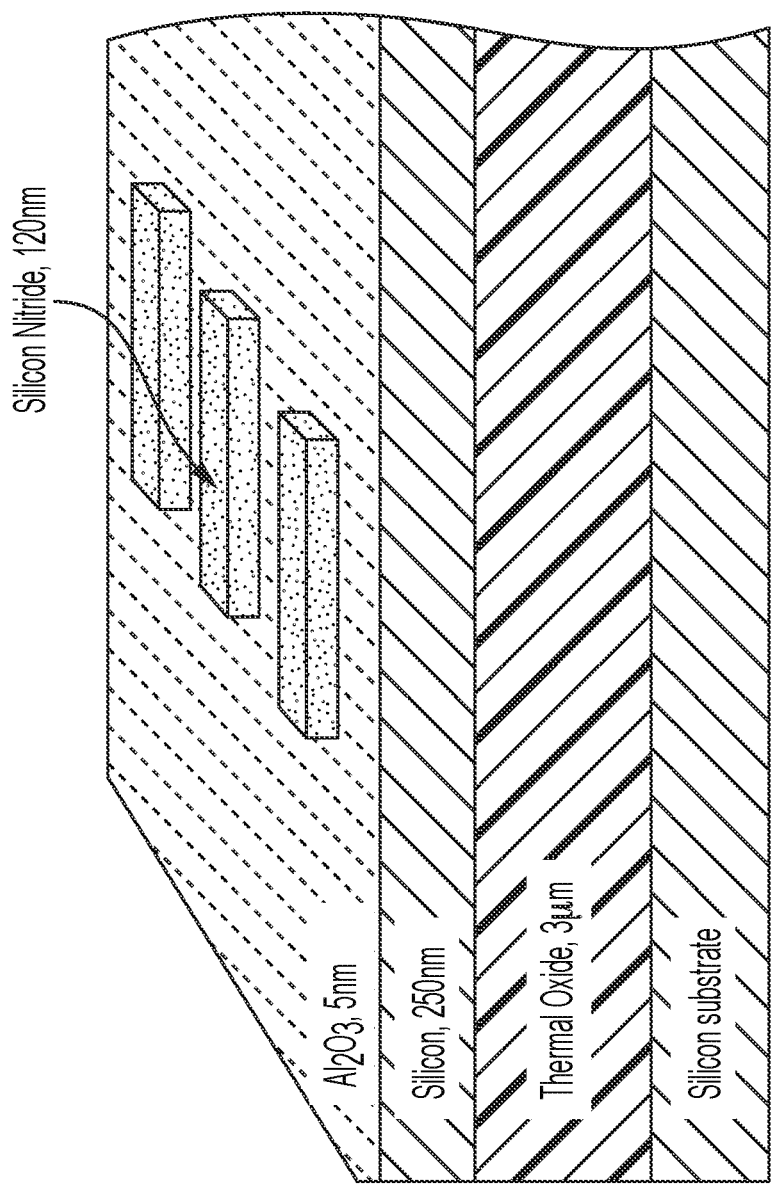
Figure 8C:
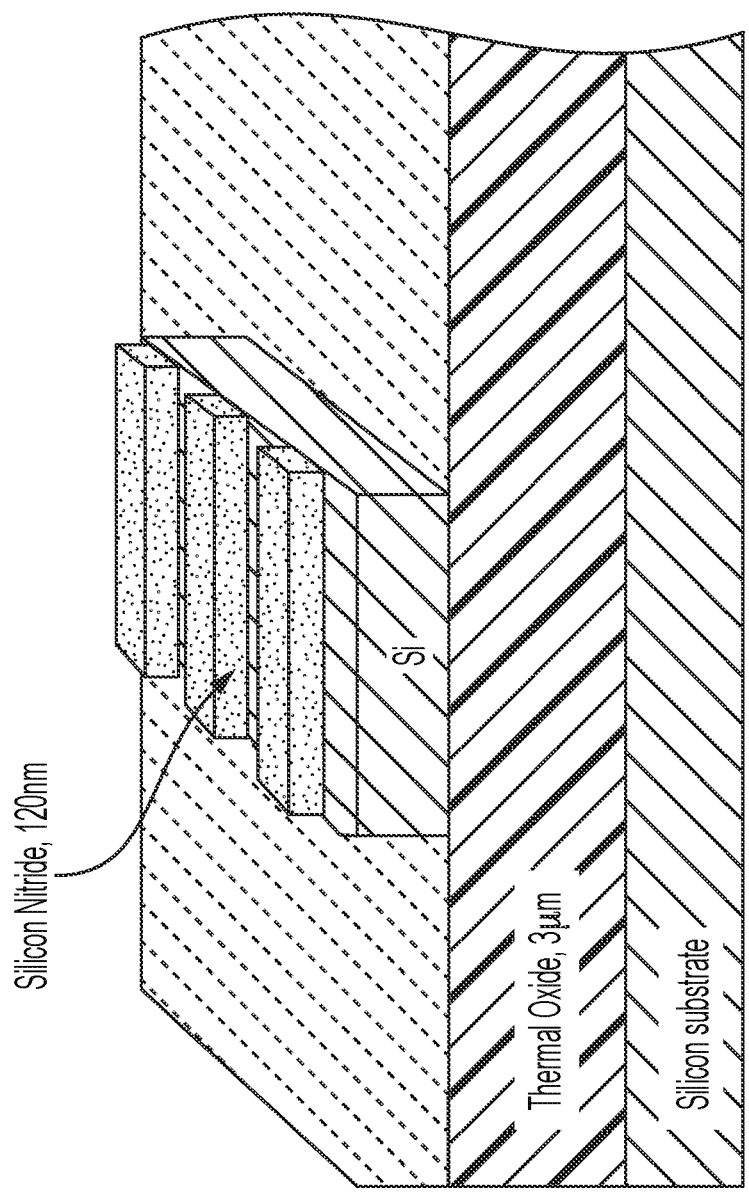
Figure 8D:
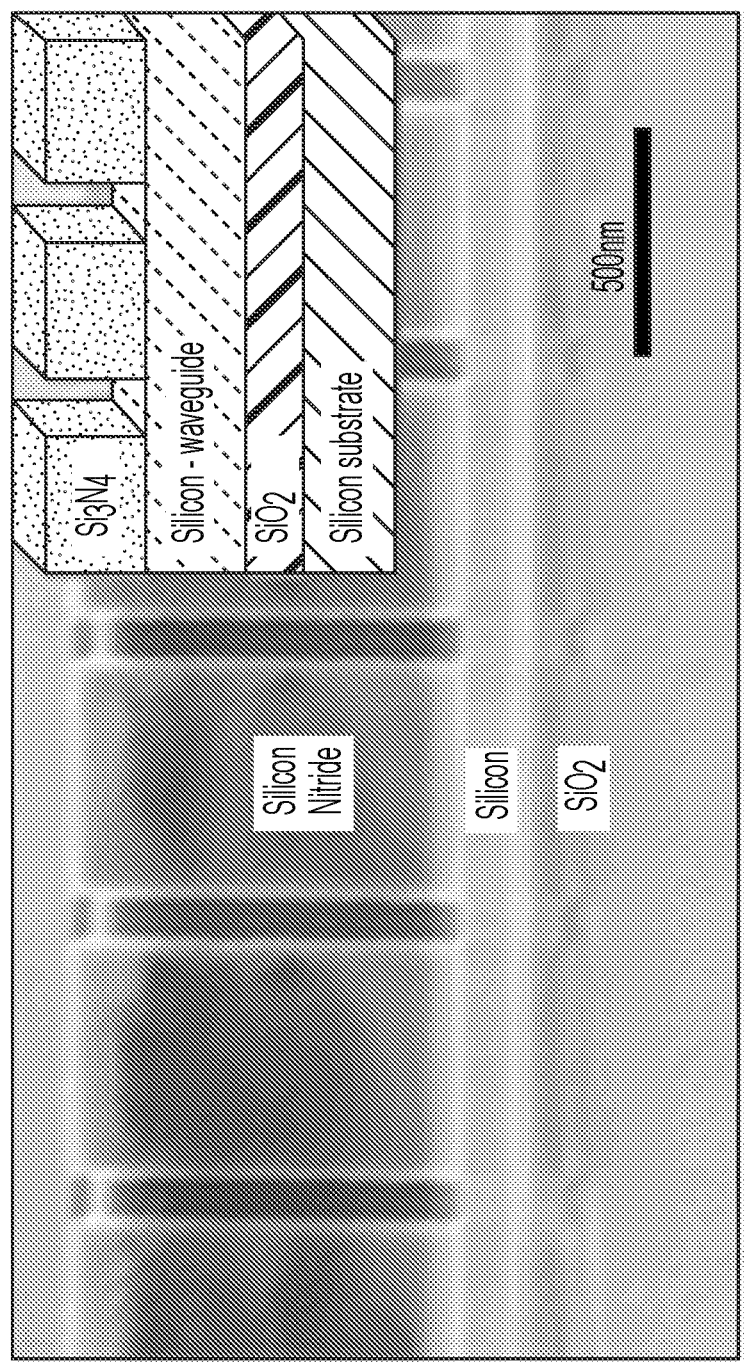

FIG. 7 illustrates examples for designing gratings with uniform emission (the blue curve in (b)). We find the grating's strength for each duty cycle (shown in (a)) and the required strength per grating period seen in orange in (b). By combining both we can find the duty cycles required along the grating's length to realize the required grating's output profile.

FIG. 8 illustrates a process flow and SEM image.

Figures 9A, 9B:
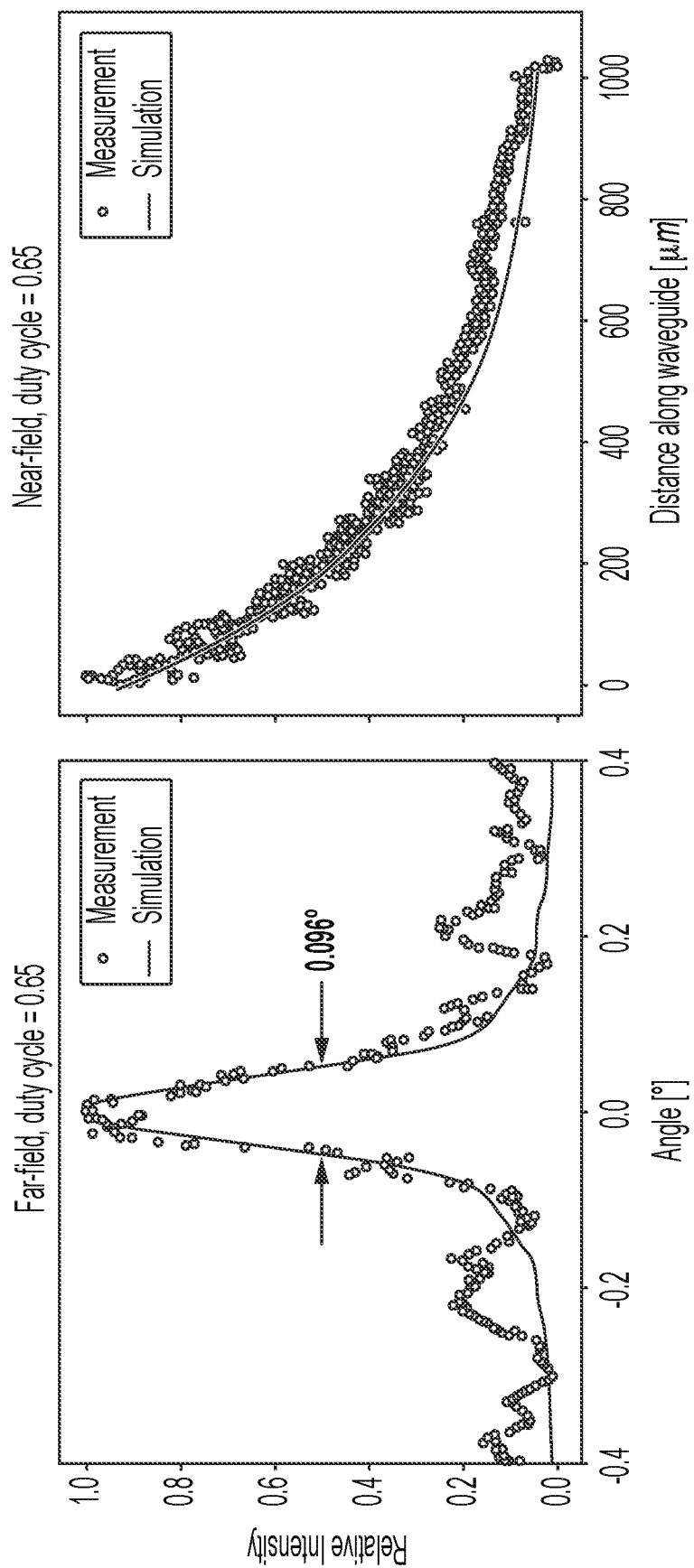
FIG. 9 illustrates near-field and far-field measurements and simulations for silicon-nitride/silicon platform. (a) and (c) Far-field measurement and simulations for 1 mm grating with a constant and apodized duty cycle, respectively. (b) and (d) Near-field grating emission profile of constant and apodized duty cycle, respectively. As expected, although both gratings' length is the same, the larger effective aperture of the apodized grating enabled smaller beam divergence.
Figure 9D:
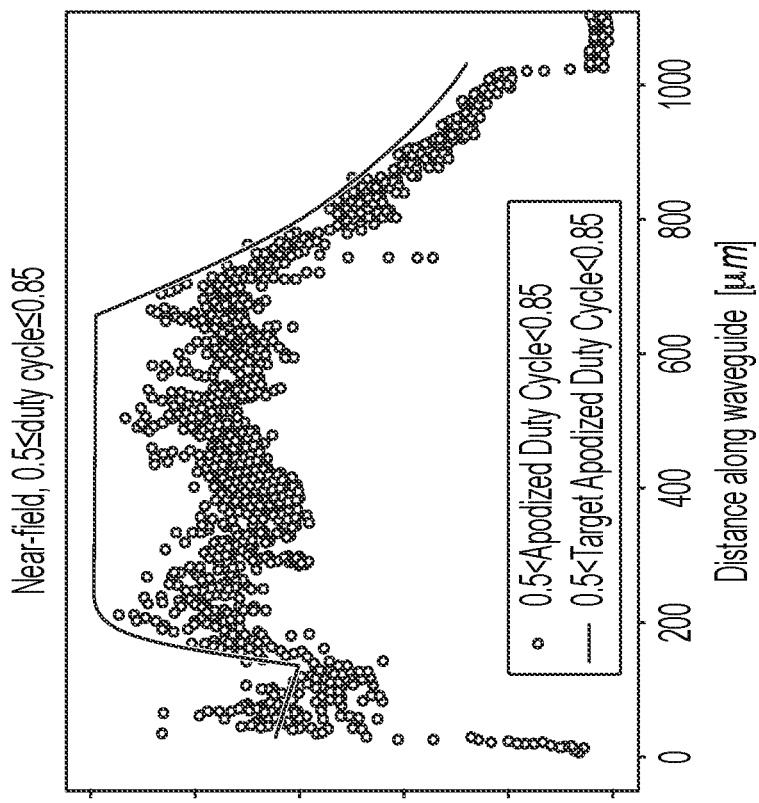
Figure 9C:
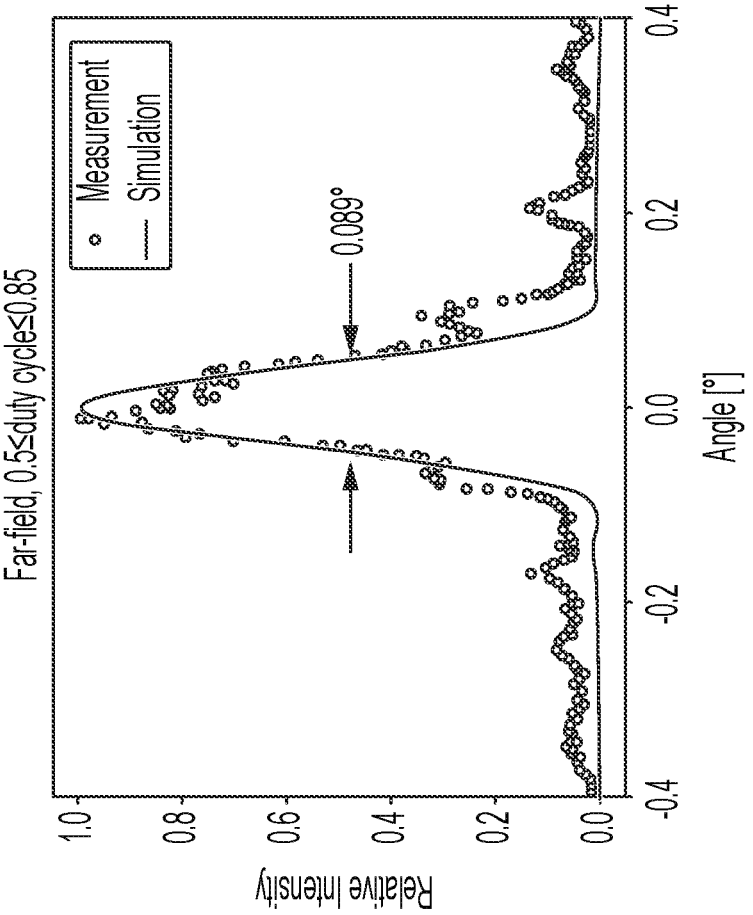

FIG. 9 illustrates results for our grating, we compare a gratings with constant duty cycle to one with custom duty cycle showing the near- and far-field profiles.

Figure 10:
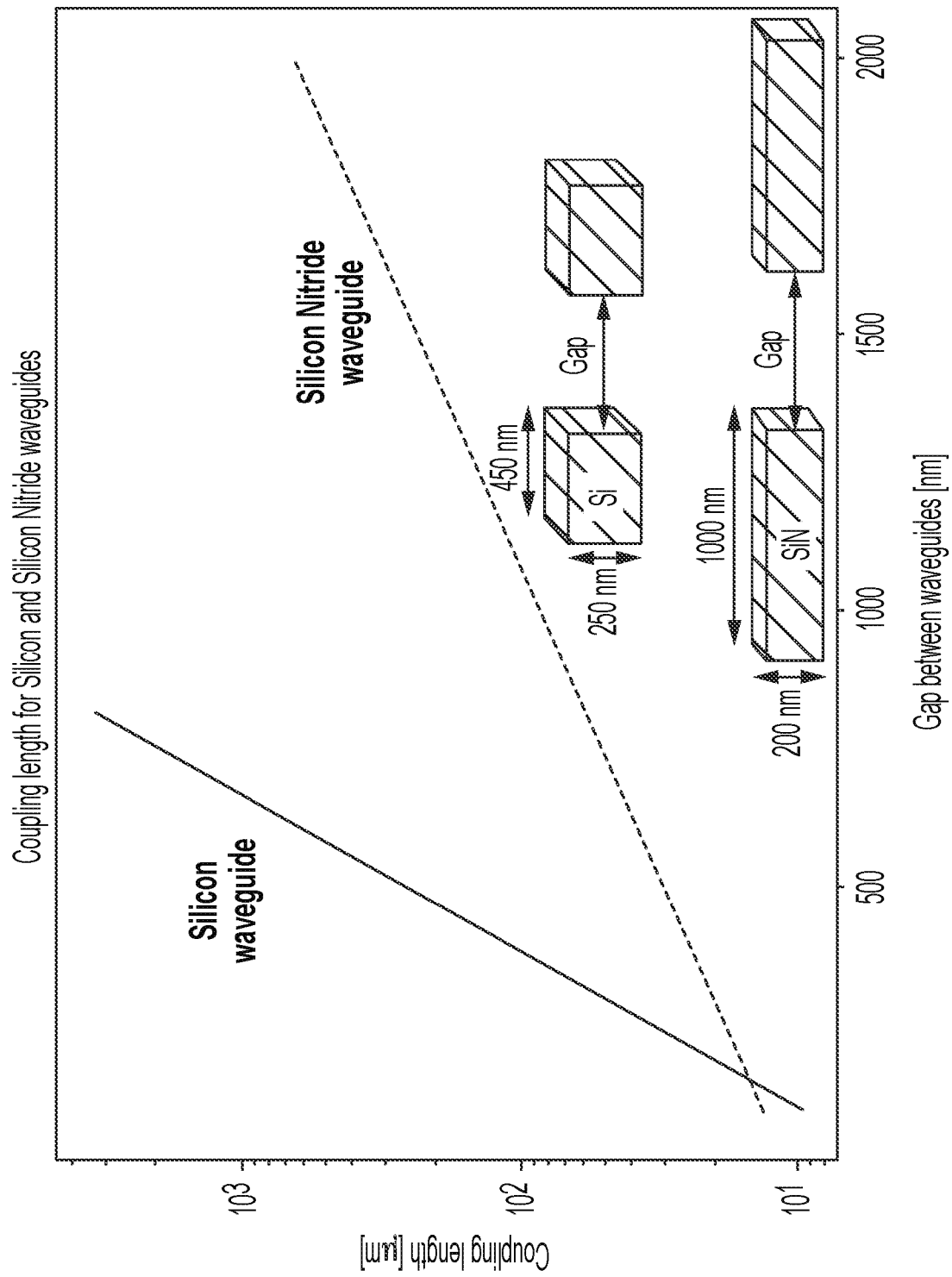
FIG. 10 illustrates the dependence of the gap between waveguides and coupling length.

FIG. 10 illustrates the dependence of the gap between waveguides and coupling length. For an array it is better to have long coupling length as this indicates low cross talk. The figure show that it is advantageous to use Silicon waveguides as they allow for smaller gaps for the same coupling length.

What is claimed is:

1. A millimeter scale weak grating coupler comprising a waveguide having a plurality of bars of overlay material of length (a) disposed periodically at a uniform period ($\wedge$) adjacent a surface and along a length of the waveguide,
   wherein the length (a) of each of the bars and gaps between the bars vary along the length of the waveguide;
   wherein a duty cycle defined by the length (a)/period ($\wedge$) varies along the waveguide;
   wherein the duty cycle of (a/$\wedge$) varies monotonically along the length of the waveguide configured to provide a substantially uniform output profile; and
   wherein the overlay material has an index of refraction that is between an index of refraction of the waveguide and an index of refraction of a material disposed adjacent the waveguide and the plurality of bars of overlay material.

2. The grating coupler of claim 1, wherein the length (a) of each of the bars decreases and gaps between the bars increases along the length of the waveguide, whereby grating strength of the coupler decrease along the length of the waveguide.

3. The grating coupler of claim 1, wherein the duty cycle of (a/$\wedge$) increases along the length of the waveguide.

4. The grating coupler of claim 1, wherein the duty cycle decreases along the waveguide as a grating strength decreases.

5. The grating coupler of claim 1, further comprising a stop layer disposed between the overlay material and the waveguide.

6. The grating coupler of claim 1, wherein a dimension of one or more bars of overlay material along at least one axis is varied across the plurality of bars.

7. A method of forming a grating coupler comprising:
   a. depositing on a wafer a stop layer;
   b. depositing a grating layer on the stop layer;
   c. patterning desired gratings; and
   d. etching, based on the patterning, the grating layer to create a waveguide including the desired gratings, whereby bars of the remaining grating layer of width "w" and length "a" are disposed periodically at a uniform period "$\wedge$" on the wafer, the length (a) of each of the bars and gaps between the bars varying along a length of the gratings,
   wherein a duty cycle defined by the length (a)/period ($\wedge$) varies along the waveguide;
   wherein the duty cycle of (a/$\wedge$) is varied monotonically along the length of the waveguide configured to provide a substantially uniform output profile, and
   wherein the remaining grating layer comprises a material having an index of refraction that is between an index of refraction of the waveguide and an index of refraction of a material disposed adjacent the waveguide and the bars of the remaining grating layer.

8. The method of claim 7, wherein the length (a) of each of the bars decreases and gaps between the bars increases along the length of the waveguide, whereby a grating strength of the gratings decreases along a surface of the wafer.

9. The method of claim 7, wherein the duty cycle of (a/$\wedge$) increases along a surface of the wafer.

10. The method of claim 7, further comprising patterning and etching a waveguide from the wafer whereby the duty cycle of (a/$\wedge$) increases along the waveguide moving away from a light source.

11. The method of claim 7, wherein depositing the stop layer comprises depositing $Al_2O_3$ or $SiO_2$, or both.

12. The method of claim 7, wherein the wafer comprises Silicon On Insulator (SOI) and wherein depositing the grating layer comprises depositing $Si_3N_4$.

13. The method of claim 7, wherein a material forming the stop layer is selected such that it will not etch during the etching step, stopping the etch from penetrating a waveguide formed in the wafer.

14. The method of claim 7, wherein etch chemistry and process parameters of the etching step are selected such that an etch rate of the stop layer is lower than an etch rate of the grating layer.

15. The method of claim 7, further comprising depositing a cladding material on the grating coupler.

16. The method of claim 15, wherein the grating layer has an index of refraction that is between an index of refraction of the wafer and an index of refraction of the cladding material.

17. The method of claim 7, further comprising analytically mapping duty cycles of the gratings to a required strength set forth by a predetermined function so as to produce a profile of duty cycles per period for an entire length of the gratings.

18. The method of claim 17, wherein the predetermined function is dependent on an emission intensity profile or phase profile as a function of a direction of propagation of light through a waveguide formed in the wafer adjacent the gratings.

19. A millimeter scale weak grating coupler comprising a waveguide having a plurality of bars of overlay material of length (a) disposed periodically at a uniform period ($\wedge$) adjacent a surface and along a length of the waveguide,
  wherein the length (a) of each of the bars and gaps between the bars vary along the length of the waveguide;
  wherein a duty cycle defined by the length (a)/period ($\wedge$) varies along the waveguide;
  wherein the duty cycle of (a/$\wedge$) varies monotonically along the length of the waveguide configured to provide a substantially uniform output profile; and
  wherein the overlay material comprises $Si_3N_4$.

20. A method of forming a grating coupler comprising:
a. depositing on a wafer a stop layer;
b. depositing a grating layer on the stop layer;
c. patterning desired gratings; and
d. etching, based on the patterning, the grating layer to create a waveguide including the desired gratings, whereby bars of the remaining grating layer of width "w" and length "a" are disposed periodically at a uniform period "$\wedge$" on the wafer, the length (a) of each of the bars and gaps between the bars varying along a length of the gratings,
wherein a duty cycle defined by the length (a)/period ($\wedge$) varies along the waveguide;
wherein the duty cycle of (a/$\wedge$) is varied monotonically along the length of the waveguide configured to provide a substantially uniform output profile, and
wherein the remaining grating layer comprises $Si_3N_4$.

* * * * *